(12) United States Patent
Jensen et al.

(10) Patent No.: US 6,970,704 B2
(45) Date of Patent: Nov. 29, 2005

(54) SYSTEM FOR DIRECT COMMUNICATIONS WITH A SPACE CRAFT

(75) Inventors: James W. Jensen, Satellite Beach, FL (US); Daniel Linnihan, Richfield, MN (US); Colin Gardner-Springer, Golden Valley, MN (US); Amy Lynn Stifter, Robbinsdale, MN (US)

(73) Assignee: Satcom Direct, Inc., Satellite Beach, FL (US)

( * ) Notice: Subject to any disclaimer, the term of this patent is extended or adjusted under 35 U.S.C. 154(b) by 588 days.

(21) Appl. No.: 10/029,230

(22) Filed: Dec. 21, 2001

(65) Prior Publication Data

US 2002/0111165 A1 Aug. 15, 2002

Related U.S. Application Data

(63) Continuation-in-part of application No. 09/303,844, filed on May 3, 1999.

(60) Provisional application No. 60/116,495, filed on Jan. 20, 1999.

(51) Int. Cl.[7] .............................................. H04Q 7/20
(52) U.S. Cl. .................... 455/431; 455/12.1; 455/13.1; 370/316; 370/310
(58) Field of Search ................................ 455/431, 445, 455/427, 430, 12.1, 13.1; 370/316, 310

(56) References Cited

U.S. PATENT DOCUMENTS

| | | | |
|---|---|---|---|
| 5,278,891 A | 1/1994 | Bhagat | |
| 5,408,515 A | 4/1995 | Bhagat | |
| 5,438,610 A | 8/1995 | Bhagat | |
| 5,481,592 A * | 1/1996 | Azer | 455/12.1 |
| 5,651,050 A | 7/1997 | Bhagat | |
| 5,805,683 A | 9/1998 | Berberich | |
| 5,828,957 A | 10/1998 | Kroeger | |
| 5,839,053 A | 11/1998 | Bosch | |
| 5,887,258 A | 3/1999 | Lemozit | |
| 5,898,768 A | 4/1999 | Beyda | |
| 5,907,541 A | 5/1999 | Fairholm | |
| 5,913,164 A | 6/1999 | Pawa | |
| 5,918,175 A | 6/1999 | Tayloe | |
| 5,937,349 A | 8/1999 | Andresen | |
| 5,950,129 A * | 9/1999 | Schmid et al. | 455/431 |
| 5,956,639 A | 9/1999 | Armbruster | |
| 5,956,644 A | 9/1999 | Miller | |
| 5,963,877 A | 10/1999 | Kobayashi | |
| 6,321,084 B1 * | 11/2001 | Horrer | 455/431 |
| 6,477,152 B1 * | 11/2002 | Hiett | 370/316 |

* cited by examiner

*Primary Examiner*—Danh Cong Le
(74) *Attorney, Agent, or Firm*—Patterson, Thuente, Skaar & Christensen, P.A.

(57) ABSTRACT

An automated communication system for communicatively connecting a caller with a communications device to an space craft. The system includes a port for accepting a call and a call management program that uses a spacecraft identifier to automatically effect the communication to the space craft via a ground earth station and a satellite. The satellite retransmits the communication to a dedicated spacecraft receiver in the space craft. The system provides Internet-based call monitoring and billing capabilities. The system reduces cost and overall connection time by using the Internet to verify the spacecraft's flying status through the ground station databases before initiating a call.

17 Claims, 16 Drawing Sheets

Fig. 2

DEFAULT DATABASE (ODB)
TABLE 1

| SATELLITE ID | SATELLITE NAME | GES ID | GES LOCATION | GES OWNER/ SERVICE PROVIDER |
|---|---|---|---|---|
| 00 | AOR-W | 001 | GOONHILLY, UK | SKYPHONE |
| 00 | AOR-W | 002 | SOUTHBURY, USA | COMSAT |
| 00 | AOR-W | 003 | LAURENTIDES, CANADA | STRATOS |
| 00 | AOR-W | 005 | AUSSAGUAL, FRANCE | STRATOS AND SATELLITE AIRCOM |
| 01 | AOR-E | 101 | GOONHILLY, UK | SKYPHONE |
| 01 | AOR-E | 103 | AUSSAGUAL, FRANCE | STRATOS AND SATELLITE AIRCOM |
| 01 | AOR-E | 104 | EIK, NORWAY | SKYPHONE |
| 01 | AOR-E | 105 | FUCINO, ITALY | COMSAT |
| 02 | POR | 201 | SENTOSA, SINGAPORE | SKYPHONE |
| 02 | POR | 202 | SANTA PAULA, USA | COMSAT |
| 02 | POR | 203 | YAMAGUCHI, JAPAN | COMSAT/KDD |
| 02 | POR | 205 | PERTH, AUSTRALIA | SATELLITE AIRCOM |
| 02 | POR | 206 | NILES CANYON, CANADA | STRATOS |
| 02 | POR | 207 | BRUNIE | BRUNIE |
| 02 | POR | 210 | KUMSAN, KOREA | COMSAT/KDD |
| 03 | IOR | 301 | EIK | SKYPHONE |
| 03 | IOR | 302 | NONTHABURI, THAILAND | CONSAT/KDD |
| 03 | IOR | 303 | AUSSAGUAL, FRANCE | SATELLITE AIRCOM |
| 03 | IOR | 305 | PERTH, AUSTRALIA | SATELLITE AIRCOM |
| 03 | IOR | 306 | YAMAGUCHI, JAPAN | COMSAT/KDD |
| 03 | IOR | 307 | BRUNIE | BRUNIE |
| 03 | IOR | 310 | SENTOSA, SINGAPORE | SKYPHONE |
| 03 | IOR | 312 | FUCINO, ITALY | COMSAT |

Fig. 3

| Fig. 3a | Fig. 3b | Fig. 3c |
|---|---|---|

Fig. 4A

| Fig. 4A-1 | Fig. 4A-2 | Fig. 4A-3 |
|---|---|---|

Fig. 5A http://206.147.237.72/satcomadmin/SystemStatus.htm - Microsoft Internet Explorer File  Edit  View  Favorite  Tools  Help Back  Forward  Stop  Refresh  Home  Search  Favorites  History  Mail  Print  Edit  Discuss  Full Screen Address http://206.147.237.72/satcomadmin/SystemStatus.htm Current System Status

| Line # | Call ID | Start Time | End Time | DNIS | Airplane | Service | Terminal | Status |
|---|---|---|---|---|---|---|---|---|
| 1 | 78069 | 12/12 14:18:48 | 14:19:01 | 4200 | American Expr | Aero H | | Received |
| 2 | 78067 | 12/12 14:09:25 | 14:10:29 | 4255 | Anheuser Busc | Aero H | 80088301 | Connected |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | 79067 | 12/12 14:09:35 | 14:09:35 | | Anheuser Busc | Aero H | Elk | Forced Hangup |
| 12 | 78067 | 12/12 14:09:35 | 14:10:29 | | Anheuser Busc | Aero H | Southbury | Connected |
| 13 | 78066 | 12/12 14:08:56 | 14:10:41 | | Clay Lacy Aviat | Aero H+ | Southbury | Connected |
| 14 | 79066 | 12/12 14:08:56 | 14:09:27 | | Clay Lacy Aviat | Aero H+ | Santa Paula | Forced Hangup |
| 15 | 78067 | 12/12 14:09:35 | 14:10:04 | | Anheuser Busc | Aero H | Santa Paula | Forced Hangup |
| 16 | | | | | | | | |
| 17 | | | | | | | | |
| 18 | | | | | | | | |
| 19 | | | | | | | | |
| 20 | | | | | | | | |

Refresh Speed: Very Fast ▼  Refresh Now

Fig. 5B-1

CITI Group/N316GS (DNIS 4087) - Aero-H
*CallID 77793 at 12/11/01 11:02:02AM*

Incoming Call on Line 1

| Log# | Date/Time | Message |
|---|---|---|
| 4825600 | 12/11/01 11:02:02AM | Call 77793 received with DINS 4087 |
| 4825601 | 12/11/01 11:02:02AM | Use English prompts for this airplane |
| 4825602 | 12/11/01 11:02:06AM | Call is a Satellite call |
| 4825606 | 12/11/01 11:02:12AM | Caller presses '2', which connects to 80092402 |
| 4825607 | 12/11/01 11:02:12AM | Connection parameter: 80092402 |
| 4825608 | 12/11/01 11:02:12AM | InitiateSatcom: DNIS=4087, CallID=77793, TerminalSelected=8009240 |
| 4825609 | 12/11/01 11:02:12AM | Sending Satcom request to call 18006780874 on line 13 |
| 4825610 | 12/11/01 11:02:12AM | Sending Satcom request to call 12032620872 on line 14 |
| 4825612 | 12/11/01 11:02:12AM | Sending Satcom request to call 18005517534 on line 12 |

Outgoing Call on Line 12

| Log# | Date/Time | Message |
|---|---|---|
| 4825619 | 12/11/01 11:02:12AM | Received Satellite request to call 18005517534 from TimeSlot 1 |
| 4825621 | 12/11/01 11:02:12AM | Unrouted line |
| 4825623 | 12/11/01 11:02:12AM | Picked up line |
| 4825625 | 12/11/01 11:02:13AM | Dialing |
| 4825629 | 12/11/01 11:02:17AM | Wait for noise |
| 4825630 | 12/11/01 11:02:17AM | Started recording Greeting77793_12.wav |
| 4825647 | 12/11/01 11:02:22AM | Greeting detected |
| 4825648 | 12/11/01 11:02:22AM | Send PIN 103053465 |
| 4825653 | 12/11/01 11:02:25AM | Recorded Noise77793_12.wav |
| 4825654 | 12/11/01 11:02:26AM | Send AESID 3580092402# |
| 4825658 | 12/11/01 11:02:29AM | Enable tones |
| 4825659 | 12/11/01 11:02:29AM | Wait for Ring |
| 4825660 | 12/11/01 11:02:29AM | Recorded Connection77793_12.wav |
| 4825691 | 12/11/01 11:02:43AM | Detected tone 'R' |
| 4825692 | 12/11/01 11:02:43AM | Ring or busy detected |
| 4825693 | 12/11/01 11:02:43AM | 2 second pause begins |
| 4825694 | 12/11/01 11:02:45AM | End of 2 second pause |
| 4825695 | 12/11/01 11:02:45AM | Setting maxnonsilence = 50ms |
| 4825696 | 12/11/01 11:02:45AM | Disabling tone 2 |
| 4825697 | 12/11/01 11:02:45AM | Flushing buffer |
| 4825698 | 12/11/01 11:02:45AM | Recording ConnType77793_12.wav |
| 4825703 | 12/11/01 11:02:50AM | Phone Line is Busy (Timeout occurred) |
| 4825704 | 12/11/01 11:02:50AM | Disable tones |

Outgoing Call on Line 13

| Log# | Date/Time | Message |
|---|---|---|
| 4825615 | 12/11/01 11:02:12AM | Received Satellite request to call 18006780874 from TimeSlot 1 |
| 4825616 | 12/11/01 11:02:12AM | Unrouted line |

Fig. 5B-2

```
4825618  12/11/01  11:02:12AM  Picked up line
4825624  12/11/01  11:02:13AM  Dialing
4825627  12/11/01  11:02:17AM  Wait for noise
4825628  12/11/01  11:02:17AM  Started recording Greeting77793_13.wav
4825651  12/11/01  11:02:24AM  Greeting detected
4825652  12/11/01  11:02:24AM  Send AESID 580092402#
4825655  12/11/01  11:02:27AM  Wait for #
4825656  12/11/01  11:02:27AM  Received digit '#'
4825657  12/11/01  11:02:27AM  Send PIN 837035#
4825661  12/11/01  11:02:29AM  Enable tones
4825662  12/11/01  11:02:29AM  Wait for Ring
4825663  12/11/01  11:02:30AM  Recorded Connection77793_13.wav
4825666  12/11/01  11:02:32AM  Detected tone 'R'
4825667  12/11/01  11:02:32AM  Ring or busy detected
4825668  12/11/01  11:02:32AM  Setting maxnonsilence = 50ms
4825669  12/11/01  11:02:32AM  Disabling tone 2
4825670  12/11/01  11:02:32AM  Flushing buffer
4825671  12/11/01  11:02:32AM  Recording ConnType77793_13.wav
4825679  12/11/01  11:02:37AM  Phone LIne is Busy (Timeout occurred)
4825680  12/11/01  11:02:37AM  Disable tones
```

Outgoing Call on Line 14

| Log# | Date/Time | | Message |
|---|---|---|---|
| 4825617 | 12/11/01 | 11:02:12AM | Received Satellite request to call 1203260872 for TimeSlot 1 |
| 4825620 | 12/11/01 | 11:02:12AM | Unrouted line |
| 4825622 | 12/11/01 | 11:02:12AM | Pausing 20 seconds before dialing |
| 4825672 | 12/11/01 | 11:02:32AM | Picked up line |
| 4825673 | 12/11/01 | 11:02:33AM | Dialing |
| 4825675 | 12/11/01 | 11:02:37AM | Wait for noise |
| 4825676 | 12/11/01 | 11:02:37AM | Started recording Greeting77793_14.wav |
| 4825687 | 12/11/01 | 11:02:41AM | Greeting detected |
| 4825688 | 12/11/01 | 11:02:41AM | Pausing 5 seconds before entering digits |
| 4825699 | 12/11/01 | 11:02:46AM | Send AESID 580092402# |
| 4825702 | 12/11/01 | 11:02:49AM | Wait for # |
| 4825707 | 12/11/01 | 11:02:52AM | Received digit " |
| 4825708 | 12/11/01 | 11:02:52AM | Send PIN 837035# |
| 4825709 | 12/11/01 | 11:02:54AM | Enable tones |
| 4825710 | 12/11/01 | 11:02:54AM | Wait for Ring |
| 4825711 | 12/11/01 | 11:02:54AM | Recorded Connection77793_14.wav |
| 4825715 | 12/11/01 | 11:02:57AM | Detected tone 'R' |
| 4825716 | 12/11/01 | 11:02:57AM | Ring or busy detected |
| 4825717 | 12/11/01 | 11:02:57AM | Setting maxnonsilence = 50ms |
| 4825718 | 12/11/01 | 11:02:57AM | Disabling tone 2 |
| 4825719 | 12/11/01 | 11:02:57AM | Flushing buffer |
| 4825720 | 12/11/01 | 11:02:57AM | Recording ConnType77793_14.wav |
| 4825730 | 12/11/01 | 11:03:02AM | Phone Line is Busy (Timeout occurred) |
| 4825731 | 12/11/01 | 11:03:02AM | Disabled tones |

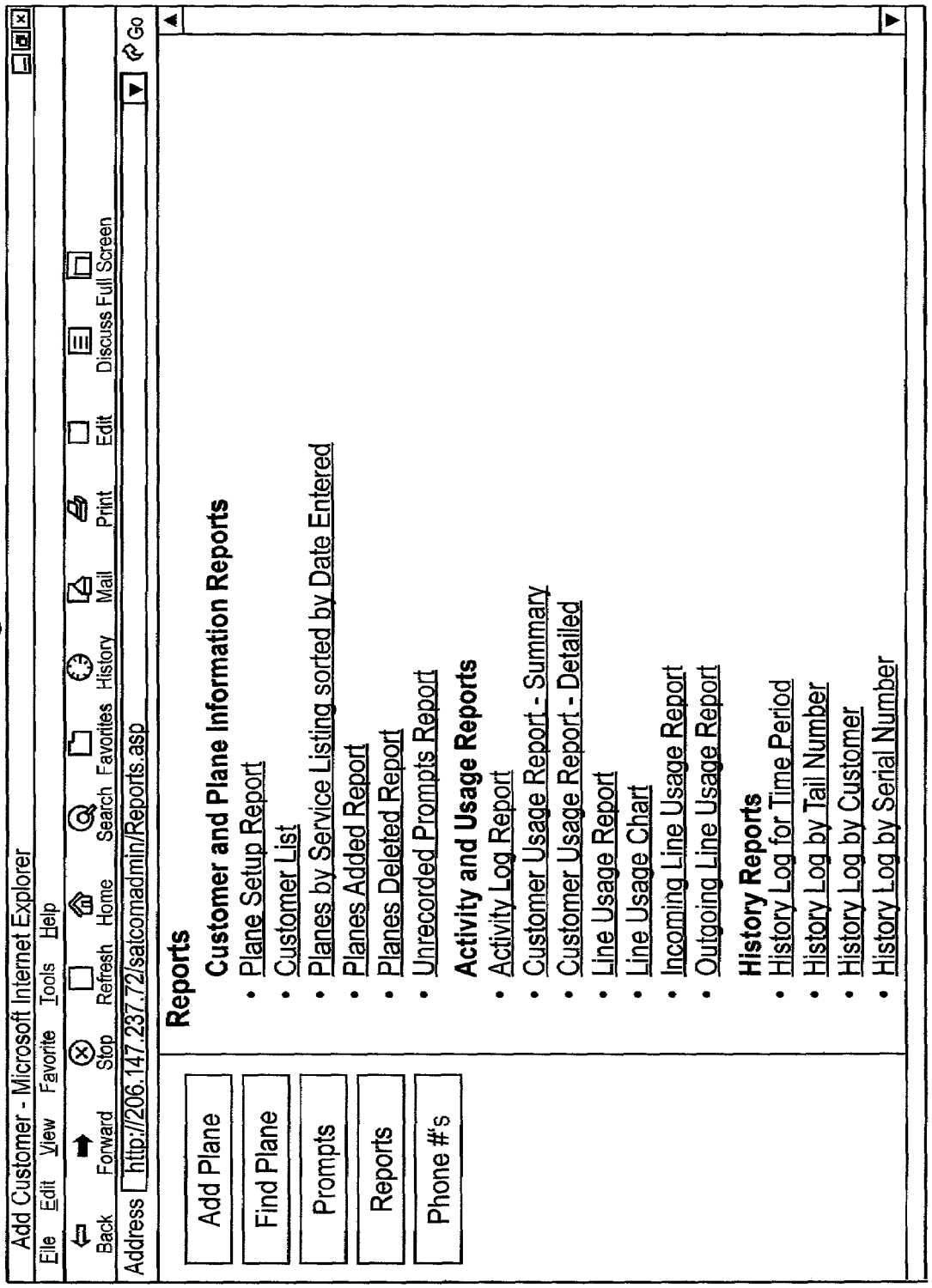

Fig. 8

Satcom DIRECT, INC. OPS CENTER

Modify Existing Airplane

| | | | |
|---|---|---|---|
| Phone #: | (651)796-4018 | Serial #: | 5344 |
| Customer: | Boeing | AESID: | 50746104 |
| Tail #: | N344BA | Service: | Aero H |
| Aircraft Type: | CL604 | Phone System: | Sat9000/C2000 |
| Language: | English | | |

Greeting: ○ Add New
● Use Existing  Boeing/N344BA ▼

You have called Boeing flight operations aircraft number N344BA

Additional Comments:

☑ Active

- Home
- Customers
- Add Plane
- Find Plane
- Prompts
- Reports
- Phone #'s

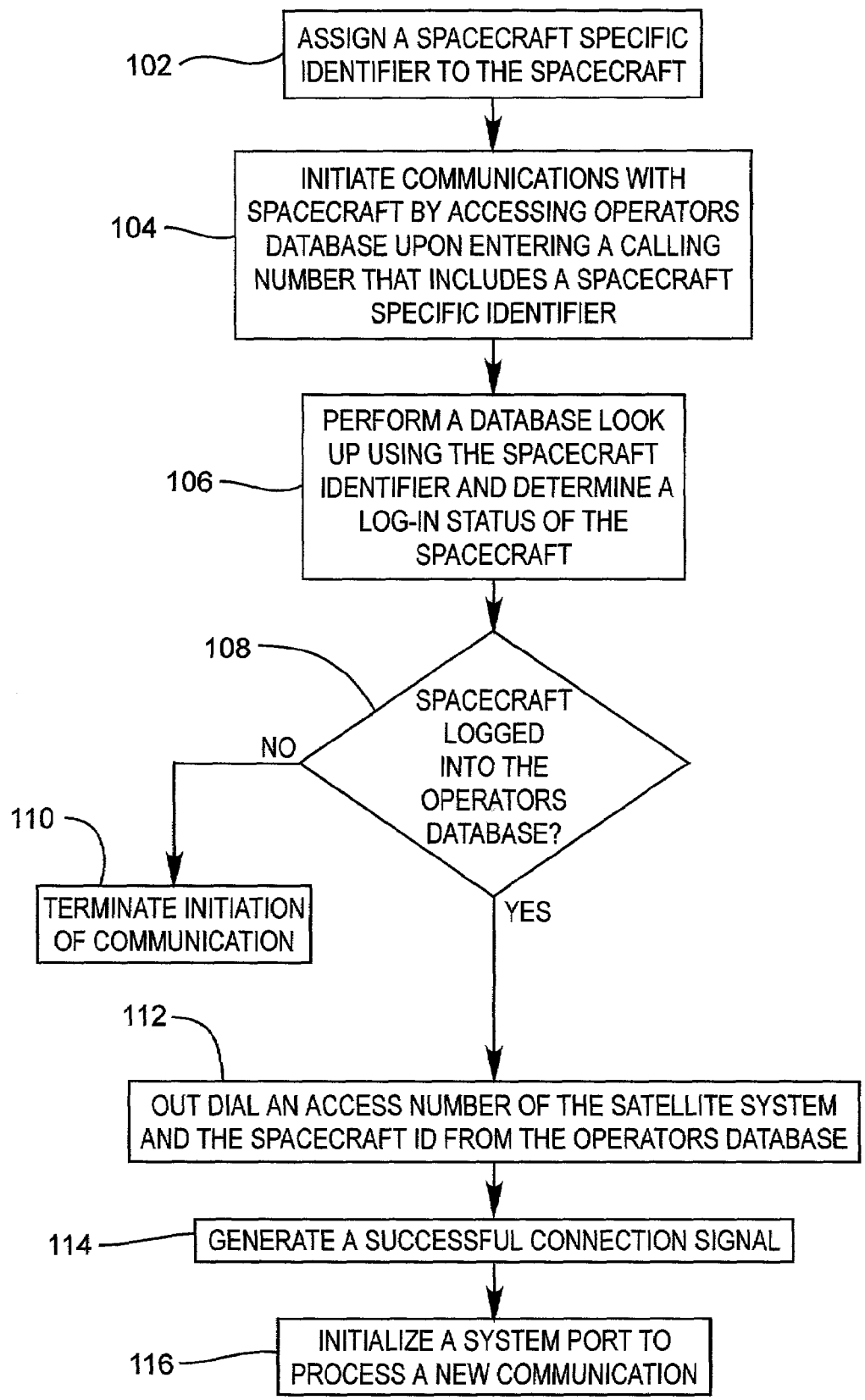

SYSTEM FOR DIRECT COMMUNICATIONS WITH A SPACE CRAFT

RELATED APPLICATION

This application claims the benefit of and is a continuation-in-part of U.S. application Ser. No. 09/303,844, filed May 3, 1999 and claims the benefit of U.S. Provisional application Ser. No. 60/116,495, filed Jan. 20, 1999, the both of which are hereby incorporated by reference in their entirety.

FIELD OF THE INVENTION

The present invention generally pertains to a system implemented to provide direct global ground to air and air to ground communications between a space craft and a terrestrial station. Specifically, the invention relates to a computer-implemented software which enables direct communications between a ground position and a specified spacecraft via a global aeronautical satellite communications system based on an operator's data base.

DESCRIPTION OF RELATED ART

There are several types of satellites deployed into orbit around the earth. Some satellites reflect communications directed at the satellite. Many satellites carry repeaters (for receiving and retransmitting a received communication) and are used for communication. In recent years satellites have been placed in synchronous orbits (synchronous with the earth's rotation), thereby providing continuous communications capability among almost all parts of the globe. If a satellite is placed in synchronous orbit above the equator, to revolve in the same direction of the earth's rotation and synchronized with the earth's rotation, that satellite will continually remain above a fixed point on the surface of the earth. Many communications satellites have been placed in these synchronous orbits to cover different regions of the globe.

Generally, active communications satellites are orbiting repeaters with broadband characteristics. A signal from a ground station is intercepted by the satellite, converted to another frequency and retransmitted at a moderate power level to an end user receiver. This provides much better signal strength at the receiving end of the circuit, as compared with a signal that is merely reflected from a passive satellite. Active communications satellites are placed in synchronous orbits making it possible to use them with fixed antennas, a moderate level of transmitter power and at any time of the day or night. Synchronous satellites are used for television and radio broadcasting, communications, weather forecasting, and military operations. Nowadays, most telephone calls are routinely carried by synchronous satellites.

Further, a constellation of satellite systems is used to cover major regions of the globe to enable ground to aircraft (and aircraft to ground) communications via the satellite systems. One example of such a constellation is INMARSAT, which has four satellites that are located in geostationary orbits and generally each cover a region of approximately one-fourth of the world with a certain amount of overlap between regions. These satellites are referred to as AORW (Atlantic ocean region-west), AOR-E (Atlantic ocean region-east), IOR (Indian ocean region), and POR (Pacific Ocean Region). INMARSAT satellites support three different types of services to the aeronautical market. These services are defined as AERO H, AERO H+, AERO I, Swifth64 and AERO M. All these services are available to aeronautical users. The airborne satcom system provides aircraft with multiple digital voice, fax, and real-time data communications capabilities. The system is specifically adapted for use in global two-way ground to air communications by aircraft operators requiring voice, fax, and data communications for their flight crews and passengers.

Similarly, the AERO I system provides aircraft with multiple digital voice, fax and real-time communications capabilities. This service is tailored to meet the communication needs of short/medium haul aircraft operators requiring voice, fax and data communications for the flight crew and passengers. AERO I spot beam service is available within each INMARSAT satellite region around the world. Each region contains several spot beams and users must be illuminated by a spot beam for an AERO I system to operate. Not all satellite regions have complete spot beam coverage and, based on the geographic location of an aircraft, users may not be able to use their AERO I system all the time.

The INMARSAT AERO H+ system provides aircraft the option to use AERO H or AERO I based on the geographic location of the aircraft. To take advantage of this option, the aeronautical communication system must be able to support both AERO H and AERO I.

Prior art systems have utilized direct ground to air calling systems which provide communications between aircraft and GES's. Generally, customers are provided with a calling card with instructions on how to call their aircraft. The card is customized to each customer's aircraft numbers and typically includes a pictorial image of the globe on both sides of the card. Typically, one side of the card shows three-fourths of the world surface and the other side shows the remaining one-fourth of the world surface. The user must first know the specific geographic location of the aircraft at the time of the call. Then, based on the geographic location of the aircraft (which must be known by the caller), the caller calls the applicable number referenced on either side of the card as corresponding to the known geographic location of the aircraft. For example a typical user trying to communicate with an aircraft based on three-quarters of the world coverage may have to dial several numbers then wait for voice, enter PIN, enter the satellite area code and enter the aircraft number and terminal location. This process requires dialing over thirty-one sequential numbers in addition to waiting for voice confirmation. Similarly, a communication based on one-fourth of the world coverage requires entering/dialing twenty-seven numbers. The dialing complexity involving such a large number of sequential numbers has greatly deterred use of such ground-to-air communications for contacting an aircraft.

Further, prior art systems which use synchronous satellite systems, such as the INMARSAT, for inbound and outbound telephone calls from a ground station to aircraft require the input of a number of variables to make the calls. In addition to the need to dial several access numbers, callers must know the location of the aircraft, the satellite Area code to which the aircraft is logged on to, the aircraft number, the aircraft terminal number, international access code for the specific global position of the aircraft and identification of the long distance provider may be required because not all long distance service providers may recognize the satellite area codes. Furthermore, if the aircraft is located in the AOR-E or IOR regions a call may not be made from North America. This is because AT&T, MCI and SPRINT use COMSAT for such communications. COMSAT is not a global aeronautical provider having access to the AOR-E and IOR regions.

Accordingly, prior art direct call systems are unreliable and cumbersome at best. Further, within each satellite region there are a number of Ground Earth Stations (GES), which are owned and operated by different entities and each GES provides different types of aeronautical services. For example, some GES operators support fax, while others may not offer such service. Similarly, not all GES operators support PC data, secure voice management, DID (direct in dial) and AESID (Aircraft Earth Station Identifier). Thus, some GES may support multiple numbers assigned/allocated for various services, while others have only very few numbers available to support a broad range of communication services.

There is, therefore, a need for a global calling system to enable ground stations to call an aircraft anywhere within INMARSAT and similar communication satellite systems by using only one simple phone number without the necessity for human intervention. The system should be fully automatic and mechanically implemented. Further, there is a need to provide a ground to air communications system with comprehensive features to enable real-time and efficient communications between aircraft and ground earth stations on a global coverage basis.

SUMMARY OF THE INVENTION

It is an object of the present invention to provide an interactive direct calling system structured to be modularly adaptable to satellite communication systems. The direct calling system preferably includes a software system implemented to enable efficient and reliable communications between an aircraft and a user, through a GES. The direct dialing system is based on specific numbers applicable to the global position and the type of satellite used. Preferably, only ten digits need be dialed to automatically effect ground-to-air communications by voice, fax and data. The ten digits include an area code and a seven digit phone number, the seven digit number being specific to the specific aircraft being called.

It is yet another object of the invention to provide a global direct ground to air satellite communication and calling system. The system includes an operators database (ODB) implemented in the host ground earth station, the satellite and the aircraft. In this example embodiment, the ODB of the present communications system ensures Aero H, H+, I and Mini-M plan customers are using the correct GES. There are five (5) global GES stations that support H+ and I aeronautical systems. If an Aero I plan customer, through the communications system, attempts to use a GES that does not support spot beam (Aero I) coverage, the communication system will not make the connection. An Aero H+ plan customer is still able to communicate via an Aero H (global) beam that facilitates the log onto most GES stations. Based on the level of GES services, the Aero H+ service provider may be limited on the level of service it can provide to its users. Mini-M service providers do not use GES stations and instead use LES (Land Earth Stations). LES stations support land mobile systems but users must select an Inmarsat LESO (Land Earth Station Operation) instead of GES. Most LESOs provide global coverage for Aero Mini-M.

Another object of the invention is to provide a direct access number that is customized to an aircraft. The system preferably uses two or more consortium partners of INMARSAT to provide global aeronautical communications. In one example embodiment, the Inmarsat GES stations used for global ground to air coverage include EIK, Norway, Southbury, Conn., and Santa Paula, Calif. (now owned by Telenor). The system integrates, for example, both Comsat and Telenor services to enable global communications for AERO H users, neither Comsat nor Telenor alone being global in its coverage.

It is a further object of the invention to provide a customized configuration of the ODB to match the chief characteristics of the functional units of the GES and the satellite.

Yet another object of the invention is to provide a specific and generic software. The specific software is designed to serve customers with special needs and requirements while the generic software is applicable for general use.

It is yet another object of the invention to provide a software system which is initiable by calling a specific number assigned to a specific airplane using an assigned terrestial long distance number or 800 number.

Yet another object of the invention is to provide a seamless global communications coverage to enable ground-to-air communications based on a data base software system implemented in a plurality of satellites covering the whole globe, GES and aircraft systems.

The present invention is an automated communication system for communicatively connecting a caller by means of a telephone to an aircraft and includes a port for accepting a telephonic call related to a specific space craft from the caller and having a machine readable call management program, the call management program automatically effecting a telephonic communication to at least one selected ground earth station responsive thereto. The ground earth station effects communication with at least one known satellite in an earth orbit responsive to the received communication from the port. The satellite retransmits the ground earth station communications to the aircraft for reception by a dedicated receiver in the space craft, thereby establishing a telephonic communications link from the caller to the specific space craft. The present invention further includes a method and a program for effecting global communications between a ground station, a plurality of global satellite systems and a space craft.

Additional details, objects, advantages will become apparent with reference to the illustrations and drawings offered to disclose the significant features, structures and mechanisms of the present invention. The drawings are presented herein to provide a depiction of the significant features of the invention.

BRIEF DESCRIPTION OF THE DRAWINGS

FIG. 5A is a website display of the call tracking capability of the present invention.

FIG. 5B is an activity report of an example call, captured on a website screen similar to FIG. 5A, according to the present invention.

FIG. 7 is an example of the customer and airplane reports provided by the present invention.

FIG. 8 is an example of an Internet-based tool for customer modification of an airplane profile.

FIG. 9 is a flowchart illustrating a process for using the Internet to verify an airplane's flying status before a communication is initiated.

DESCRIPTION OF THE PREFERRED EMBODIMENTS

The present invention provides a simplified calling system to enable real-time global communication between a ground station and a space craft, including an aircraft. The system utilizes a software program at a call-in site (a port), an operator data base (OBD) implemented in a GES, a satellite system and a space craft. The software program manages the operator data base to enable direct communication, including voice and fax, between the GES and aircraft located in any region of the world.

Figures 1, 4A:
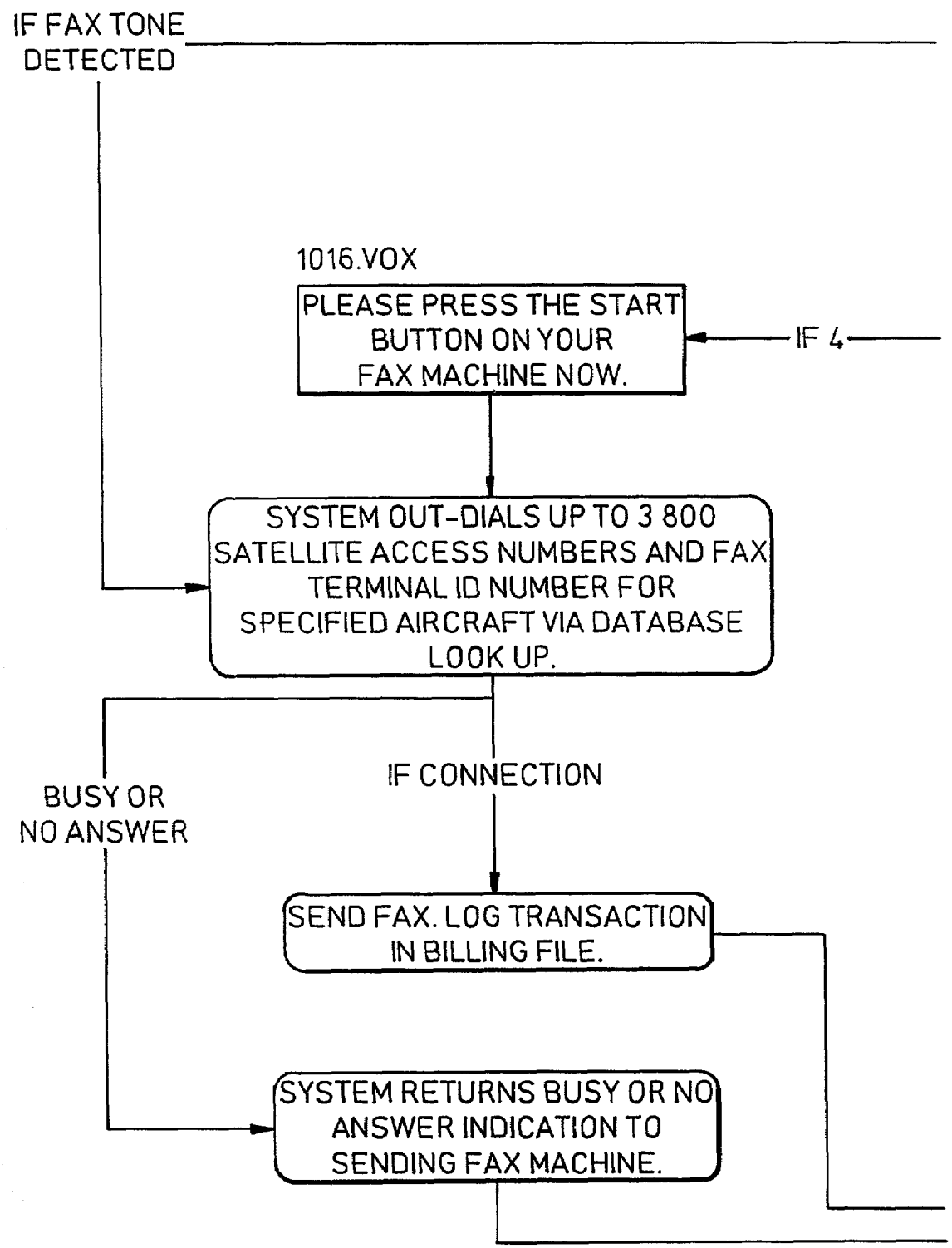
FIGS. 4A and 4B represent a software logic flow chart of another aspect of the invention.
Figures 2, 4A:
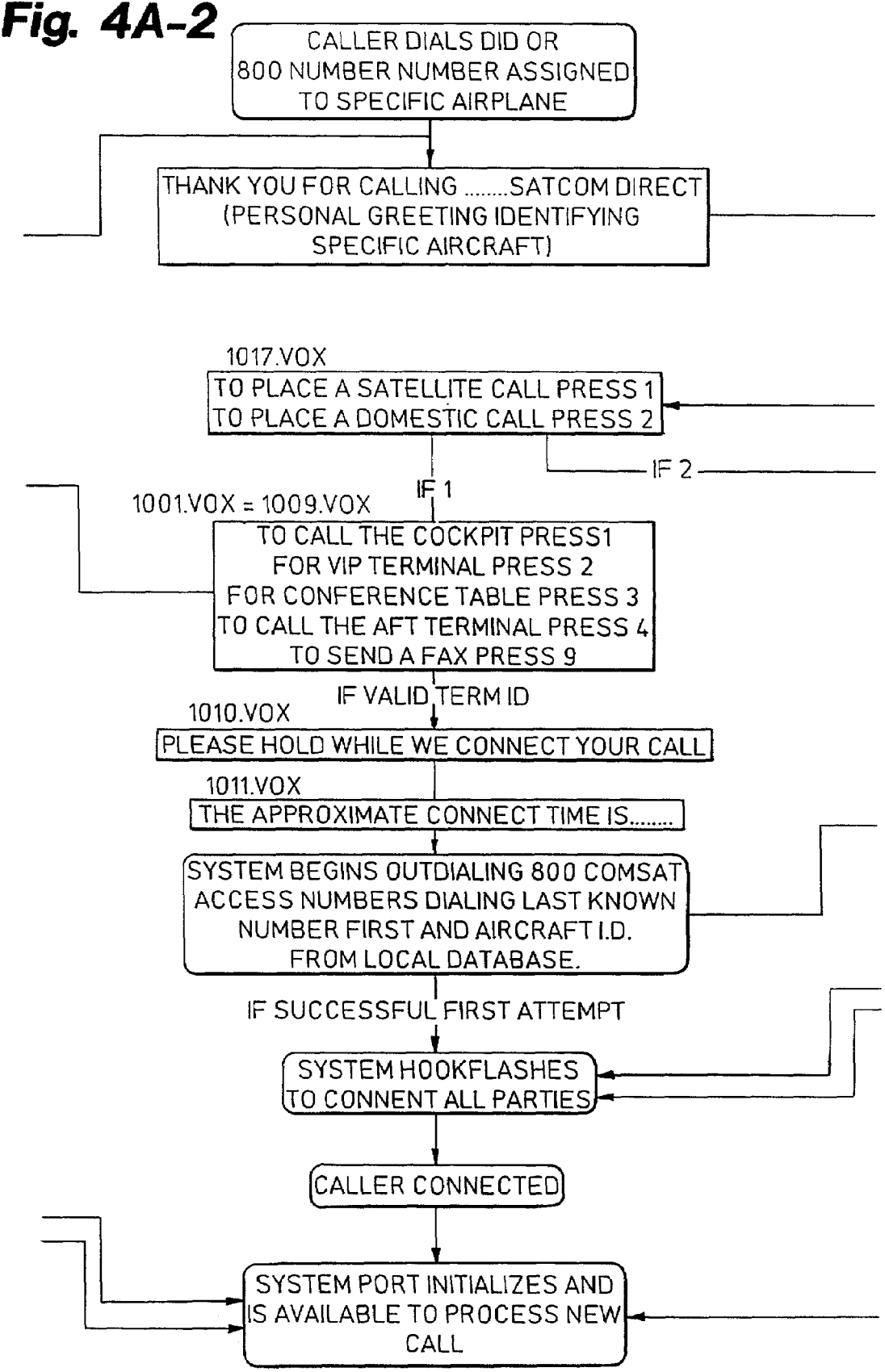
FIG. 2 is a table showing the default data listing for the operators data base.

Referring to FIGS. 1–4, in relevant parts, a global two-way air to ground communication system, including a software system implemented in the aircraft, the ground station and the satellite, is disclosed. The software system is configurable to various platforms including but not limited to Honeywell and Rockwell systems. The operator data base is preferably configured to all INMARSAT satellites and ground earth stations as illustrated in FIG. 2. Other operator data base configurations are provided in tables 2 and 3 submitted herewith.

Figures 3, 4A:
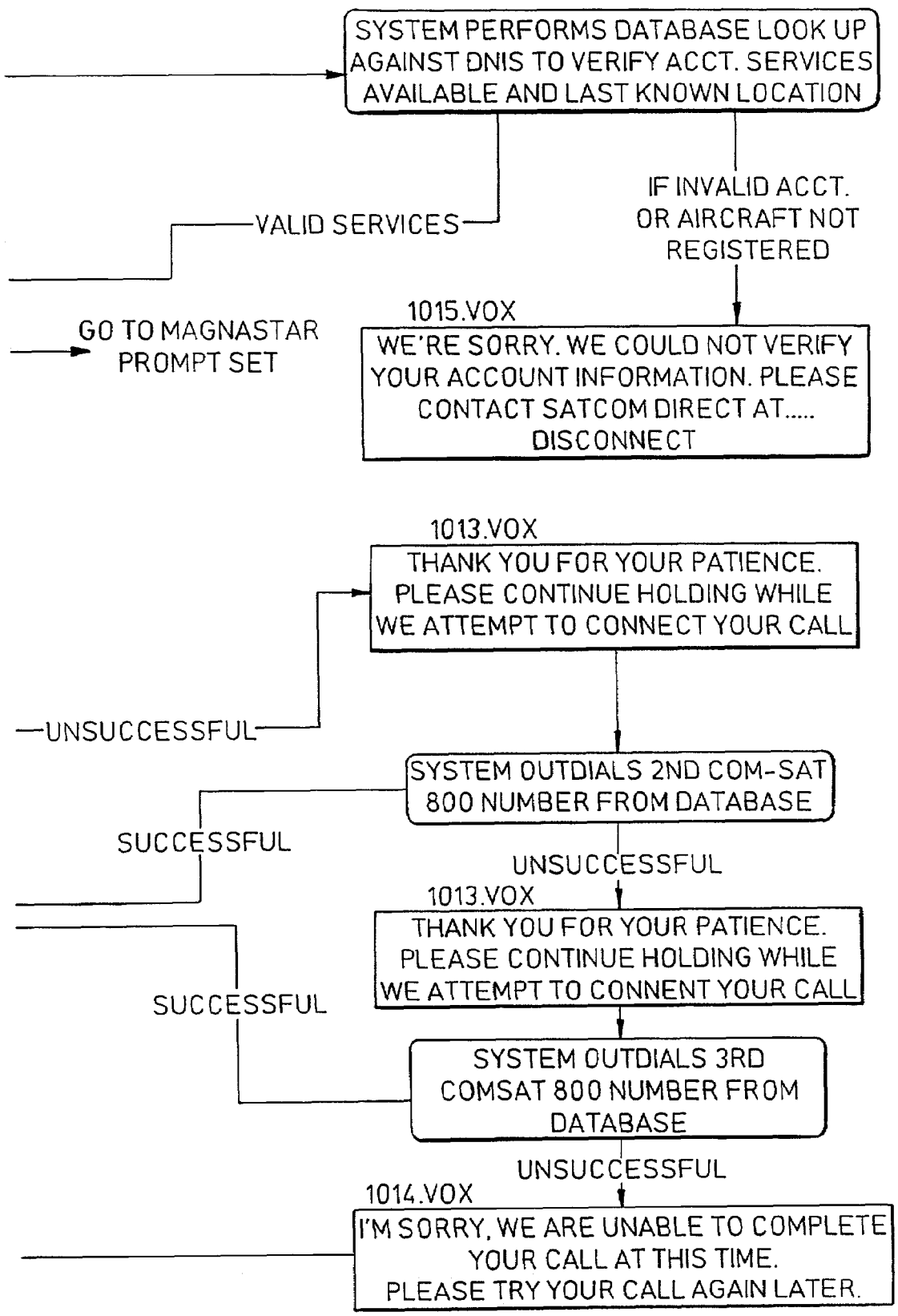

In accordance with the logic flow chart of FIGS. 3 and 4, the direct call is initiated by a caller calling a number assigned to the aircraft. The number is preferably a ten digit number for simplicity. The ten digit number is preferably presented on a wallet sized card that is presented to the user and may be conveniently carried on the person of the user at needed times. A quick reference to the number on the card prepares the user for establishing communication with the space craft over any convenient terrestial telephonic communications system. Initiating communication with the ten digit number may be as simple as dialing a long distance call. The program immediately checks to see if a fax tone from the caller is detected and simultaneously broadcasts a recorded personal greeting to the caller identifying the specific aircraft called. Subsequently, the program logic proceeds to search the data base for account verification, services available and last known location of the aircraft. If the account is found invalid or the aircraft not identified, a recorded voice message is broadcast to the caller with directions to contact the GES directly and the call is disconnected.

In the alternate, if the call is valid, the caller is given instructions to proceed to the next step of either connecting to a service or person or a procedure to send a fax. This selection by the caller directs the call to a specific site in the aircraft, for example to the flight deck or to a conference table. These sites are aircraft specific and maintained in the software. Some aircraft have multiple independent sites within the aircraft at which a call may be received. For non-fax calls, the program logic proceeds to connect the caller by outdialing the access number to the selected aircraft site. In this regard the program logic preferably dials the last known number first and the aircraft I.D. dependent upon the local database. If a successful connection has been made upon the first attempt, a system hook flashes to connect all parties and the caller is connected. Subsequently, the program logic initializes the system port and makes it ready and available to process a new call.

Figure 1:
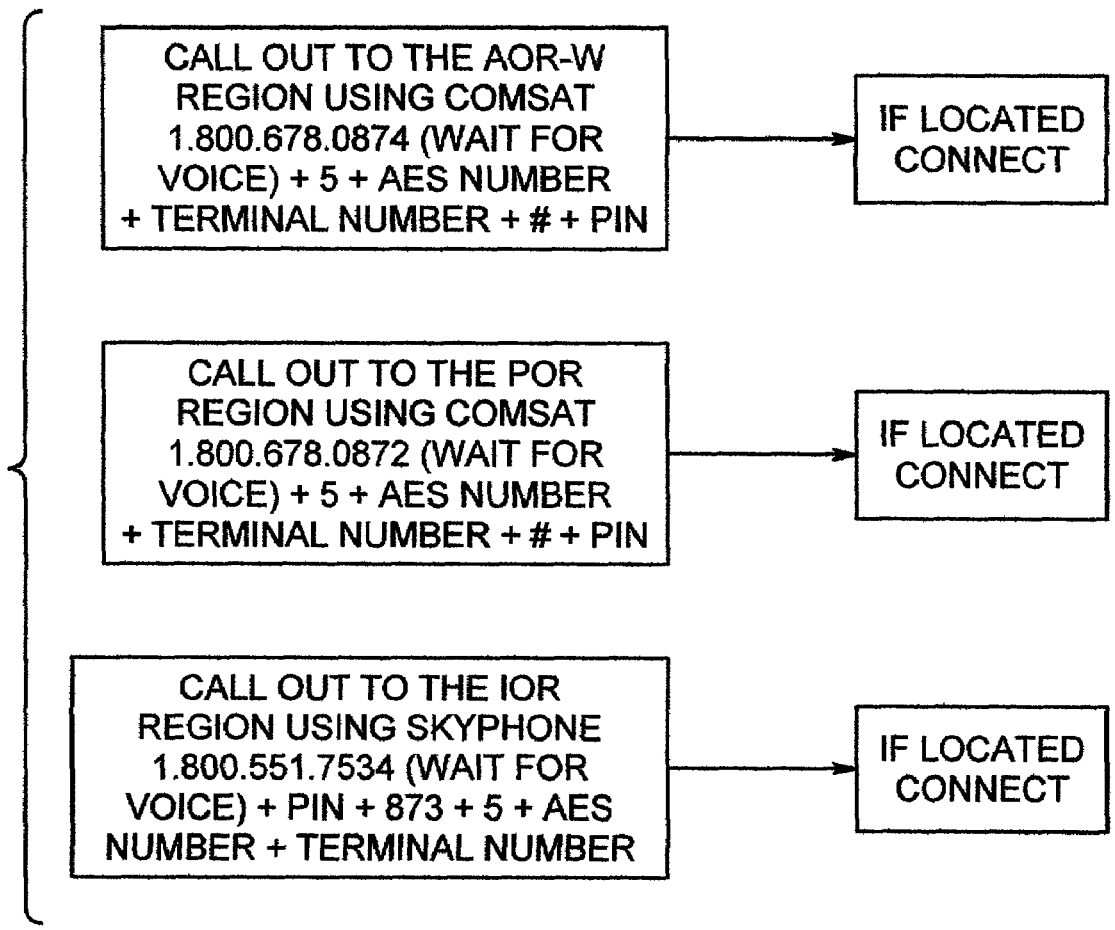
FIG. 1 is an abbreviated format of the process for direct dialing in one of AOR-W and POR regions using Comsat and calling IOR region using Skyphone.
Figure 3A:
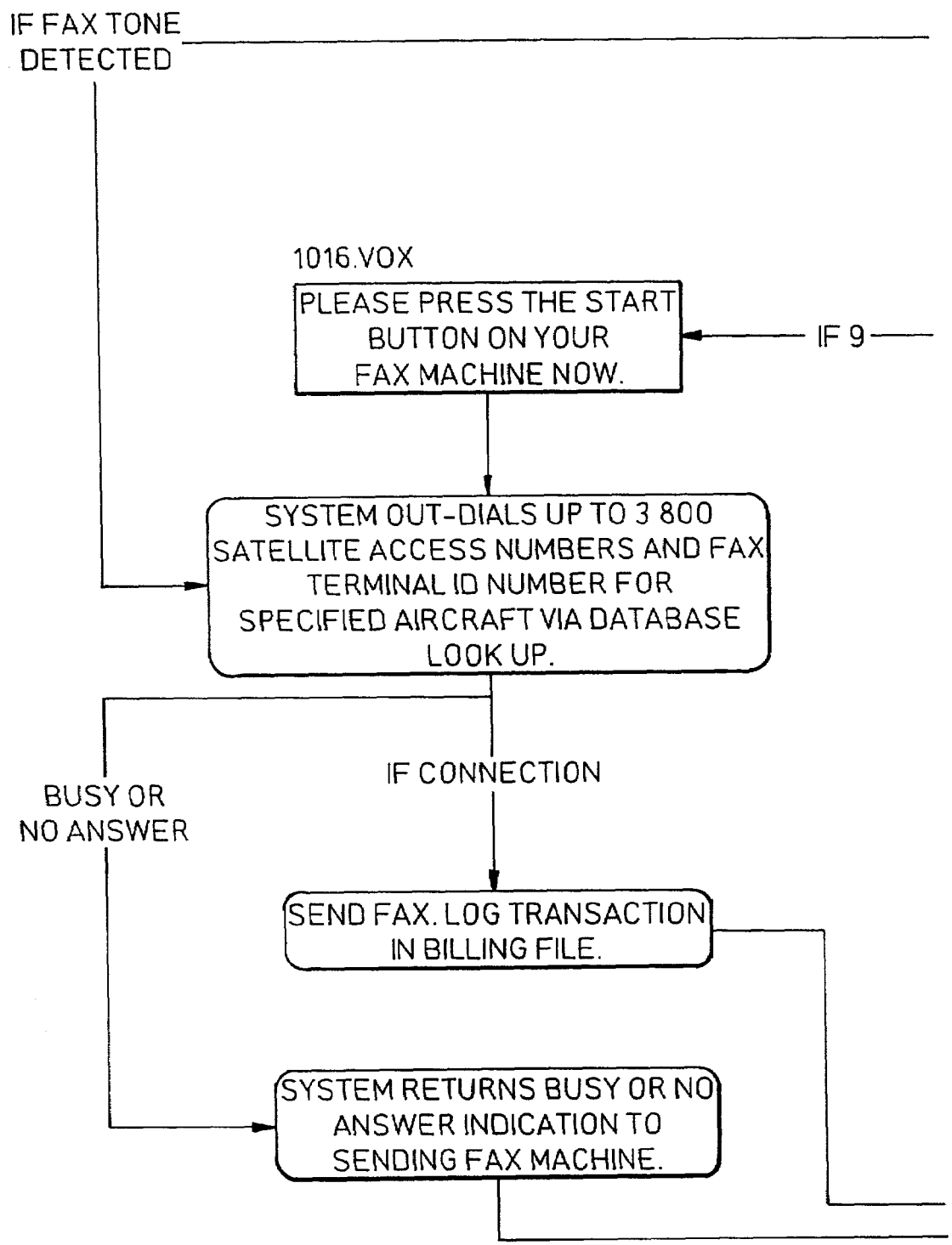
FIG. 3 is a software logic flow chart of one aspect of the invention.
Figure 3B:
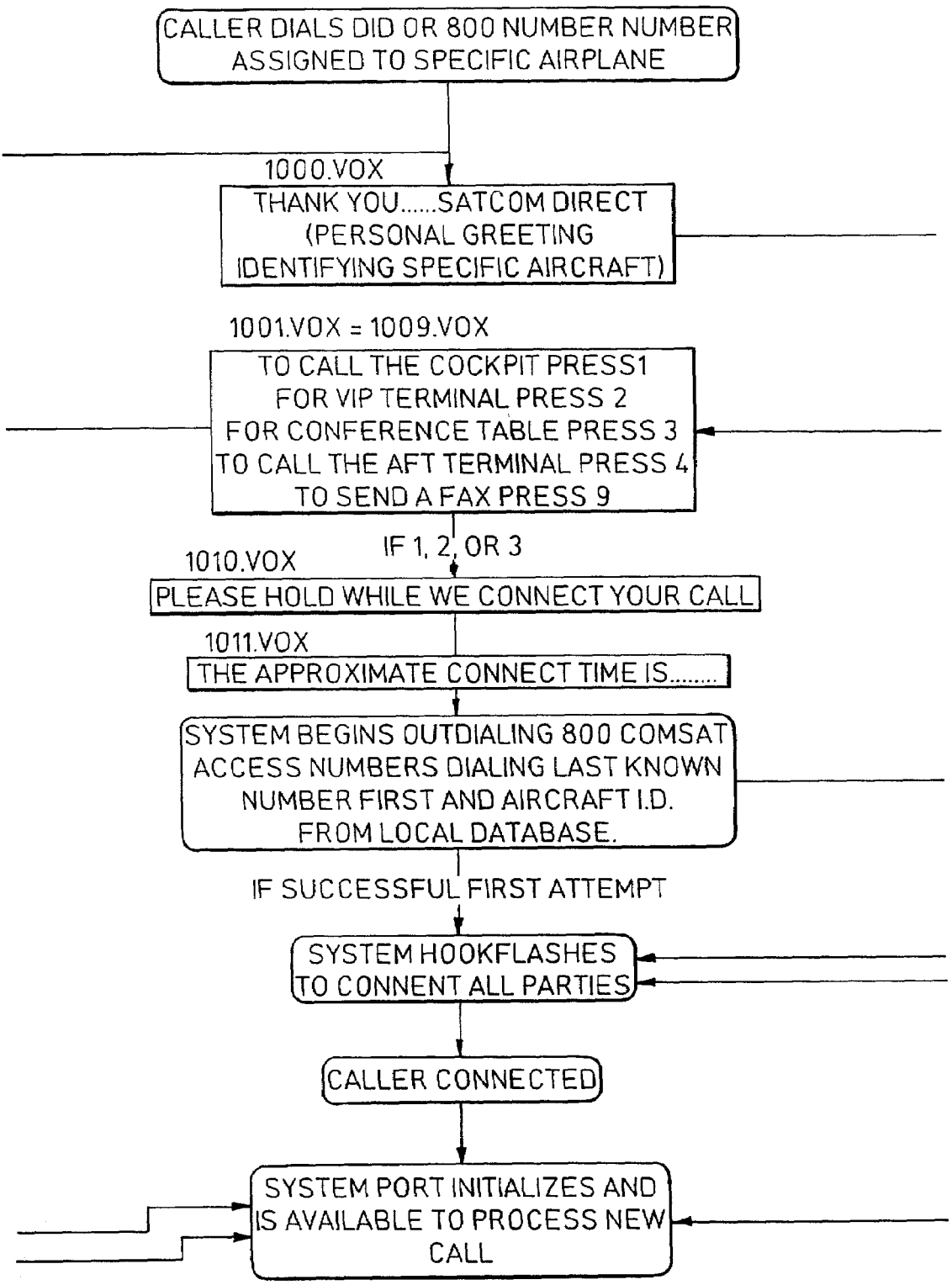
Figure 3C:
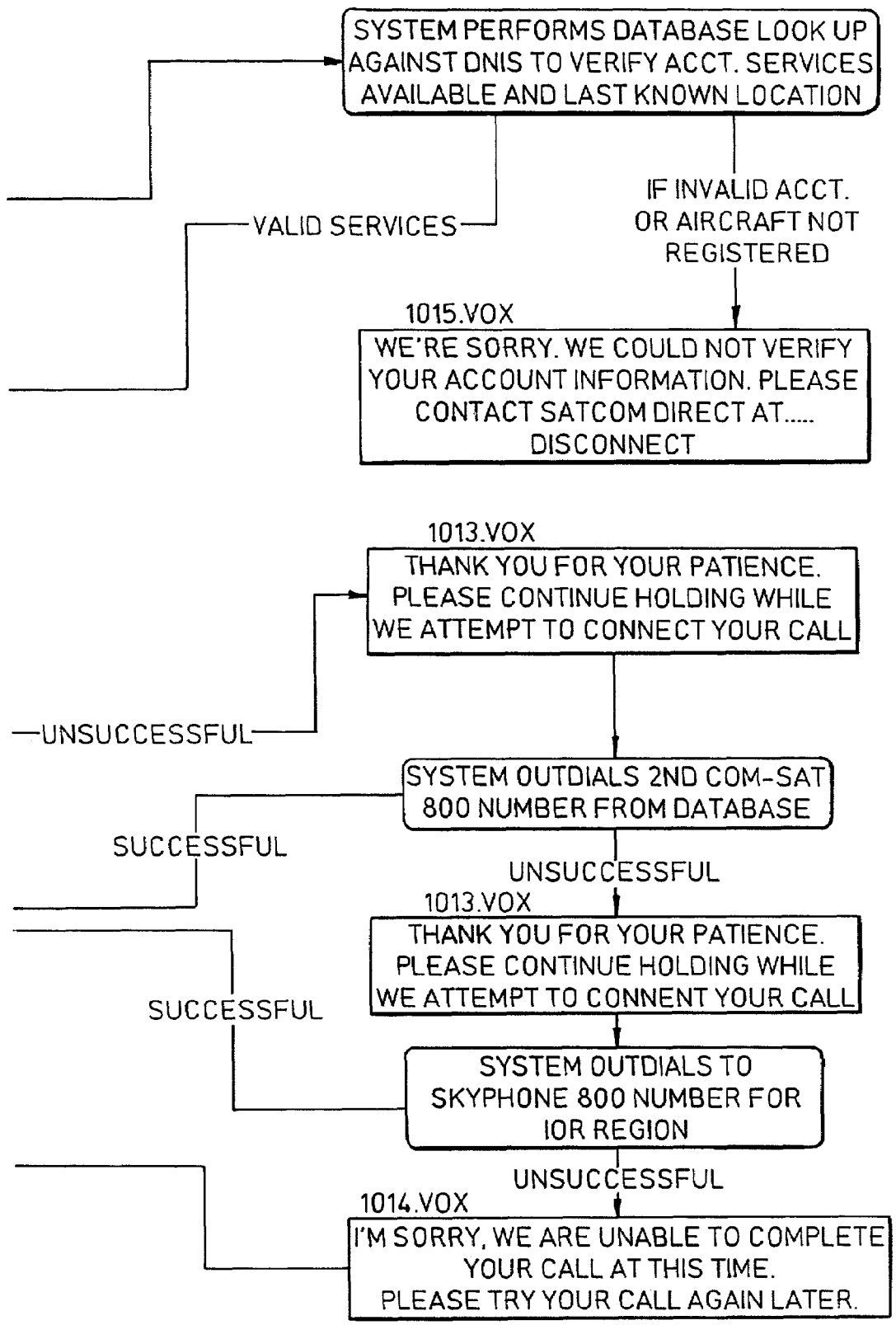

In the event the connection is not successful at the first attempt, the program logic broadcasts a message to the caller with instructions to continue holding while trying to dial a second Comsat number from the satellite data base. If this is found to be unsuccessful, the system repeats the instruction for the caller to continue holding and dials a number for the IOR region. This number is a Telecon number. In a related embodiment, once the caller has made a prompt selection from the prompt menu, the Satcom Direct service provider (SP) dials out to all three GES stations simultaneously. Based on frequency tones heard from the three GES stations used, the Satcom Direct service provider connects the call to the correct GES station and maintains the connection between the caller and aircraft. If the Satcom Direct SP is unable to detect the correct frequency tones, the program logic posts a message to the caller to try the call again and reverts back to an idle mode by initializing the system port to process a new call. As indicated in FIG. 1, the system attempts to contact the aircraft in the AOR-W or AOR-E, POR and IOR regions, as dictated by the program.

Another aspect of the program logic includes management and process of fax communications between GES and a specific aircraft. After, a caller dials the specific number assigned to a specific aircraft, the program logic looks for a fax tone. If a fax tone is detected, the program out-dials out up to three satellite access numbers and fax terminal ID numbers for the specified aircraft via data base lookup. A fax is sent by the user following the normal procedures for sending a terrestially transmitted fax. No special procedures are required for initiating a fax transmission to the space craft. This makes fax transmission with the space craft very user friendly. In the event a successful connection is made, the fax is sent and the transaction logged in a billing file or equivalent. If the line is busy or not responsive, the program logic sends a busy or no answer signal to the sender. At the end of both successful and unsuccessful fax transmission cases, the program logic reverts back to an idle mode where the system port is initialized and made available to process the next fax or phone call.

The program logic also provides the option for a caller to execute a direct call and using an options menu to send a fax. For example, the caller is provided with a set of options to connect with the cockpit, VIP terminal, conference table, or aft terminal in the aircraft. Additionally, the caller is given the option to send a fax. In either case, the program logic proceeds in the manner discussed hereinabove to execute a call or a fax.

The system of the present invention provides one toll free number for all ground to commercial aircraft callers. Multiple numbers are not required and this one number works for all airline passengers anywhere in the world. When a caller wants to call an airline passenger, the caller dials Satcom Direct's toll free number, listens to voice prompts that instruct the caller to enter the person's name they want to call and the switch locates the passenger and automatically places a call to the passenger's seat on the appropriate flight.

Figure 4B:
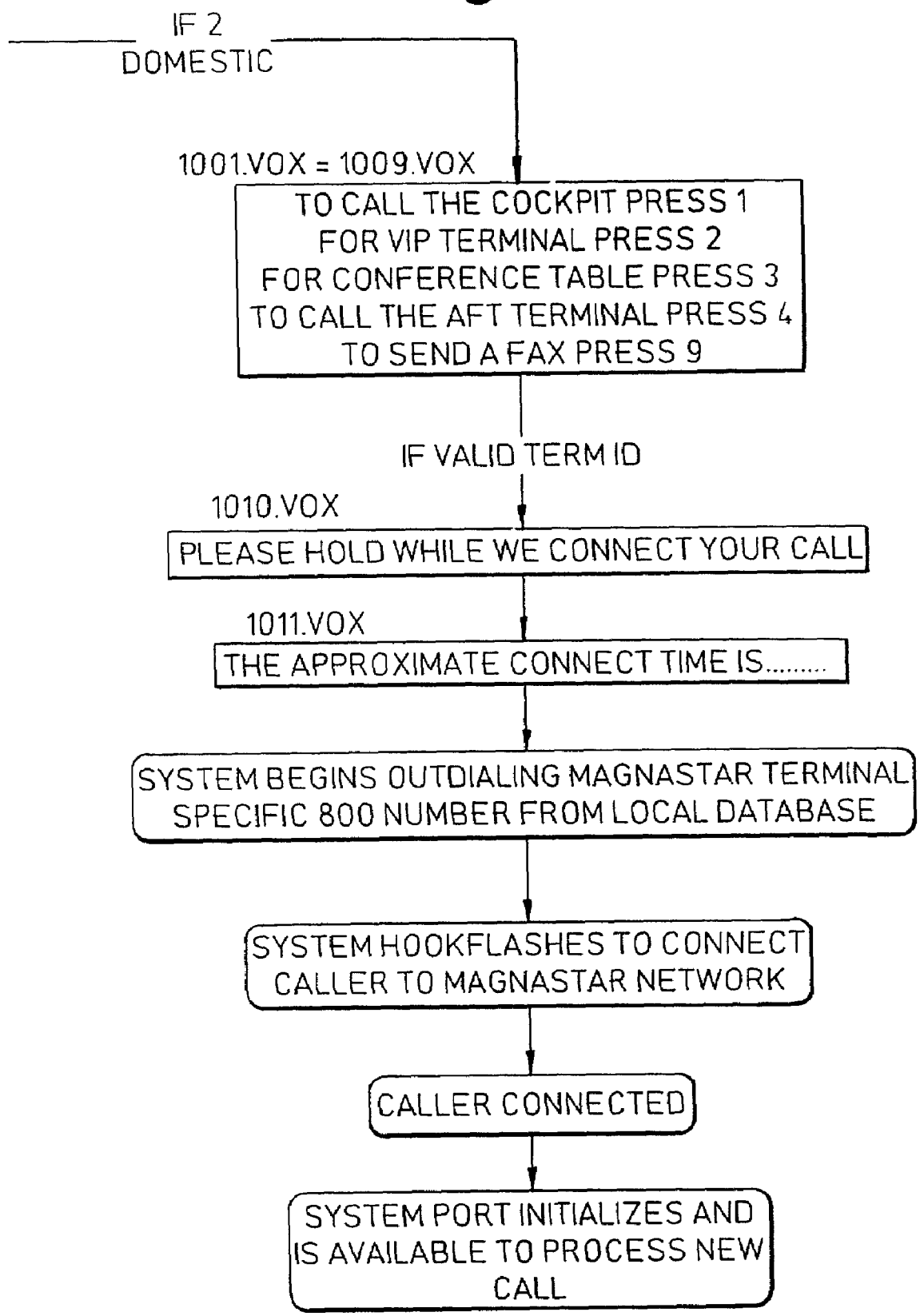

FIGS. 4A and 4B provide a program logic flow chart which is substantially similar to FIG. 3 with the exception of the additional logic steps to enable the caller to place a domestic call. In this regard, the program logic initiates outdialing terrestial calling system terminal specific numbers from a local database. Subsequently, the system hook flashes to connect the caller to the terrestial calling system network and the caller is successfully connected. Thereafter, the program logic proceeds to an idle mode and initializes the system port to make it available and ready to process the next call.

Most commercial airlines have passenger telephone systems installed in each aircraft and every aircraft has an ARINC specific 2-way data connection. ARINC is an organization that controls the aeronautical data network. Airlines lease time from ARINC to monitor each aircraft departure, arrival, engine performance, gate arrival and passenger names.

The basic technical infrastructure for Satcom Direct is in place. The aircraft telephone systems are already installed. There is a data link (ACARS) that connects into ARINC which provides passenger name and seating information. Technically, everything is in place except a call routing system. The call routing system is the present invention.

The present invention includes a telephone routing switch. This switch may be connected into the ARINC network where it may be automatically updated with airline flight information and passenger seating assignments. This access provides the switch of the present invention with updated information to track passengers seven (7) days a week twenty-four (24) hours a day.

Referring briefly to FIG. 1, in another example embodiment of the present invention, after the call management program accesses the operator's database for the space craft, instead of sequentially initiating communication with up to the three satellites in the global search for the specific spacecraft the operator's database simultaneously initiates communications with at least three satellites in an effort to search for a response from the specific space craft. In this manner, the time required to establish a connection with the specific space craft is substantially reduced because the global search is conducted simultaneously through all three satellites. Once the space craft is located, the call is routed to the appropriate satellite and region for completion of the call or communication.

The present invention is not necessarily limited to telephonic devices and can include communication devices that access the public service telephone network (PSTN), either through actual telephone lines or wirelessly, or access the Internet. Such communications devices include: desktop and portable computers, personal digital assistants (PDAs), mobile telephones, Internet appliances and the like. The use of "callers" in the specification also includes users that access the communication systems via communication devices that are not telephones. "Calls" also include communications that are initiated as messages in text, audio, data and facsimile form.

With the teachings of the present invention, it is now possible to also track the connections and attempts to connect callers with destined terminals via the use of the server and the Internet. In particular, data that is processed by a communications server that is establishing the communications link between the caller/user and the destined aircraft is now displayed through the communication service provider's (CSP) website. FIG. 5A illustrates an example of a website screen from the CSP identifying the caller ID, the start and end time of the call, the DNIS number, airplane owner, the type of service, the terminal being accessed within the plane, and the status of the call. The details of each connected or attempted connection phone call can be reviewed by the satellite communications service provider in an effort to monitor the service being provided to the customer.

Referring to FIG. 5B, an activity report illustrates an incoming call and the outgoing calls made to the three designated satellites. In this particular embodiment, the call comes in on line 1 and the server recognizes the DNIS number and proceeds to provide an English prompt for the particular airplane. Next, the server detects that the call is a satellite call and then prompts the caller to press a particular number that is associated with a desired terminal on the spacecraft. The server then proceeds to send the communications request to three different ground to earth stations which will communicate to simultaneously to three of the primary satellite that provide most of the global coverage.

Referring back to FIG. 5B, note that the outgoing calls on lines 12, 13, and 14 are continuously monitored by the server to ensure that the call to each satellite is properly made and that all of the steps to establish the connection with the specific space craft are followed before the call is terminated or ends. Once the specific spacecraft is located in one of the three outgoing calls, the communications link is established and the call is fully connected.

Figure 6:
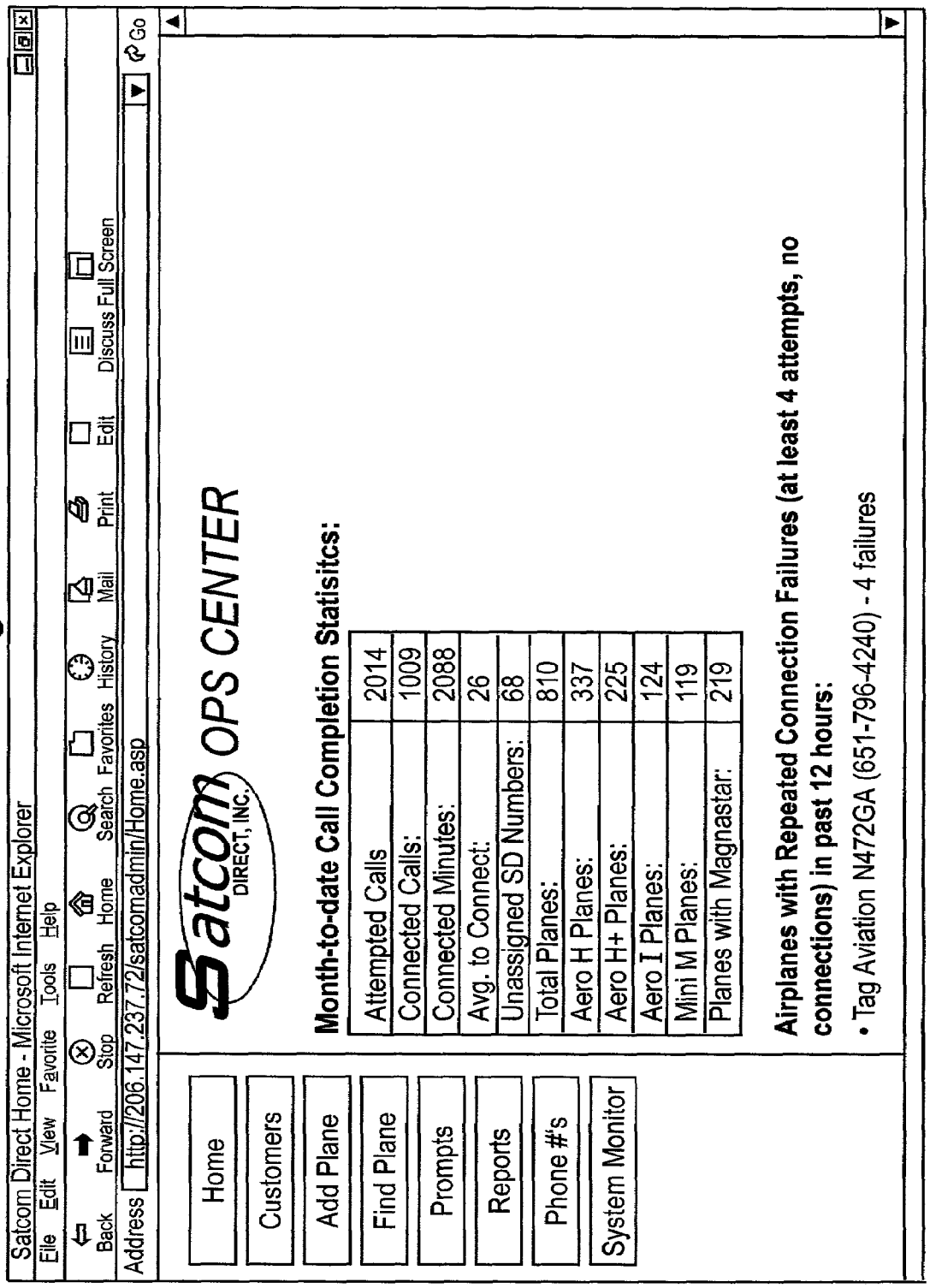
FIG. 6 is an example of the call completion statistics provided by the present invention.

With the teachings of the present invention it is also possible to generate calling completion statistics to improve customer service and to track the number of connected calls and attempted connections. FIGS. 6–7 illustrate example embodiments of Internet website screens which detail the month to date call completion statistics and customer/plane reports for all of the airplanes in the system using the various communications plans. It is possible to retrieve additional details on matters such as the plane set-up report, a customer list, reports indicating which planes have been added or deleted from the system as well as reports that address the activity usage and the historical log.

Referring to FIG. 8, the present invention facilitates the customer's access to the information on the service provider's server via the Internet. In particular, the customer is able to view the existing profile of his airplane and can proceed to make modifications to the profile without the need for the service provider's intervention. Once the changes have been effected, the information is stored in the CSP database.

Referring to FIG. 9, in another example embodiment of the communications system of the present invention costs and connection times are reduced by performing a search of the operator's database in each of the ground stations before attempting a call through the satellites. This ensures that the specific space craft or aircraft has indeed "logged on" and is currently flying within or between satellite zones. At 102, the spacecraft is assigned an identified number which is search at 104 to see if plane is "logged on." At 106, the operators database is searched using the identifier. If the plane is not flying at step 108, the cost of making or establishing the connection through any of the satellites is avoided and at step 110 the customer is advised promptly that the specific aircraft being sought is not currently logged in or flying.

Where the call management program determines that the specific aircraft is logged on (step 108), the call can be established through the appropriate satellite in less time because the log in location will identify the region in which the specific aircraft is flying or it's starting location (steps 112–116). In this particular embodiment, when the DNIS switches come in the SATCOM system will utilize the Internet to connect to the ground station database to see if the plane is logged on and will know exactly where to call based on the plane's logged in location. Instead of making the call, the Internet is used to check the operator's database to see if the plane is actually flying. In one example embodiment, the Comsat database contains data as to which planes are logged on at all times and in what region they are flying.

The present invention provides a means for simplifying the billing process for users of the communications system by using an AESID number that is assigned to the main terminal of the customer's airplane or space craft. The communications service provider then associates the AESID number with his own telephone number which includes other information that the customer provides when the profile is originally prepared. Billing information that is gathered from the ground earth station service providers is provided to the communications service providers using the AESID identification number to identify time, place and tail number of the customer that made the telephone call. All of the information that is now received from the ground earth station providers is consolidated through the SATCOM Ops Center (See FIG. 6) so as to have an integrated monetary and billing system.

The present invention in its various embodiments allows the communications service provider personnel to use Internet based technology to monitor real time ground to air voice and fax connections. In a related embodiment, this same technology is used to monitor air to ground traffic. In addition, the user or the communications service provider can activate or deactivate aircraft terminals using the Internet. Internet active controls are usable to monitor system performance and connections from any Internet connection. In its various embodiments the present invention provides the capability of using a single number to provide ground to air communications or access to the Magnastar system which is primarily located in the U.S. (supported by the Verizon network). With the integrated databasing approach of the Ops Center the CSP can maintain a call record history of each ground to air attempt through the activity log. The CSP also provides a billing program interface that facilitates the downloading of electronic data from the ground earth station service providers to the CSP operations center to facilitate billable call traffic rates between the various plant (e.g., H, H+, I and Mini-M).

In another embodiment, the CSP locates a server arrangement onsite at each of the GES stations. The onsite CSP server arrangements facilitate monitoring of air to ground as well as ground to air connections and facilitate troubleshooting of these connections. The onsite servers also decrease air-ground/ground-air connection time because the CSP has real time information as to which satellite and in which region an aircraft is logged in or is using for communications. The CSP's billing system is also more accurate and current due to real time access of billable minutes/chargeable traffic generated by each of the GES stations/operators. The CSP will also more easily track historical data on call activity.

Accordingly, the invention encompasses several improvements over the prior art. However, this disclosure is intended to provide a basic outline of the structure and operations of the invention and should not be construed as a comprehensive disclosure of the invention. The applicant reserves the right to claim, elaborate and discuss in various and appropriate details any and each of the elements shown in the disclosure submitted herewith when a formal application is filed.

What is claimed is:

1. An automated communication system for communicatively connecting a user by means of a communications device to a spacecraft, comprising:
    a port adapted to accept a call related to a specific spacecraft from the user and having a machine readable call management program, the call management program adapted to respond to a calling number that includes a spacecraft specific identifier and adapted to automatically search for the spacecraft specific identifier in a database of at least one selected ground earth station, wherein the call management system is further adapted to terminate the call upon determining that the spacecraft specific identifier is not in the database, wherein the call management program provides prompts to the user's communications device requesting transmission of a digit related to a specific terminal site in the specific spacecraft for connection to the user's communications device.

2. The communication system of claim 1, wherein the ground earth station is adapted to communicate with at least one known satellite in an earth orbit responsive to the call received from the port upon finding the spacecraft specific identifier in the database, the at least one known satellite adapted to retransmit the ground earth station communications to the specific spacecraft for reception by a dedicated receiver in the spacecraft so as to establish a communications link between the user and the specific spacecraft.

3. The communication system of claim 2 wherein caller access enables communication with the spacecraft by means of facsimile transmission.

4. The communication system of claim 1 wherein user access to the port is effected by transmission of a ten digit number to the port.

5. The communication system of claim 3 wherein the single ten digit telephone number is viewably presented on at least one wallet sized card, the card being presentable to a user.

6. The communication system of claim 4 wherein the single ten digit telephone number initiates communication with a spacecraft through terrestial telephonic communications to the port.

7. The communication system of claim 4 wherein the ten digit number includes a seven digit number associated with a specific spacecraft.

8. The communication system of claim 1 wherein the call management program initiates simultaneous communications with at least three satellites in a global search for a response from the specific spacecraft.

9. The communication system of claim 8 wherein the three satellites serving global regions include the AOR-W, POR, and IOR satellites.

10. An automated communication system for communicatively connecting a user by means of a communications device to a spacecraft, comprising:
    a port adapted to accept a call related to a specific spacecraft from the user and having a machine readable call management program, the call management program adapted to respond to a calling number that includes a spacecraft specific identifier and adapted to automatically search for the spacecraft specific identifier in a database of at least one selected ground earth station, wherein the call management system is further adapted to terminate the call upon determining that the spacecraft specific identifier is not in the database, wherein the ground earth station is adapted to communicate with at least one known satellite in an earth orbit responsive to the call received from the port upon finding the spacecraft specific identifier in the database, the at least one known satellite adapted to retransmit the ground earth station communications to the specific spacecraft for reception by a dedicated receiver in the spacecraft so as to establish a communications link between the user and the specific spacecraft and wherein the call management program provides prompts to the caller requesting transmission of a digit related to a specific site in the specific spacecraft for connection to the caller.

11. A method of processing global communications between a ground station, a plurality of global satellite systems and a specific spacecraft using a software system, the method including the steps of:

assigning a spacecraft specific identifier to the spacecraft;

initiating a communications with the specific spacecraft by accessing at least one operators database for the spacecraft and the satellite system upon entering a single calling number that includes a spacecraft specific identifier; and performing a database lookup using the spacecraft identifier to determine a log-in status of the spacecraft, if the spacecraft is not logged into the operators database then terminating the initiation of communications, wherein the operators database provides prompts to a caller requesting transmission of a digit related to a specific site in the specific spacecraft for connection to the caller.

12. The method of processing global communications of claim 11, where the spacecraft is logged into the operators database, further comprising:

outdialing at least one access number for at least one of the satellite systems and the spacecraft ID from the at least one operators database;

generating a successful connection signal; and initializing a system port to process a new call.

13. The method of processing global communications of claim 12 wherein access to the port is effected by transmission of a ten digit number to the port.

14. The method of processing global communications of claim 13 wherein the ten digit number includes a seven digit number related to the specific spacecraft to be called.

15. The method of processing global communications of claim 12, wherein the outdialing step includes initiating simultaneous communications with at least three satellites with the operators database in a global search for a response from the specific spacecraft.

16. A system for processing global communications between a ground station, a plurality of global satellite systems and a specific spacecraft using a software system responsive to the satellite systems, the system comprising:

means for assigning a spacecraft specific identifier to the spacecraft;

means, responsive to a user and to identifier assignment, for initiating a communications with the specific spacecraft by accessing at least one operators database for the spacecraft and the satellite system upon entering a calling number that includes a spacecraft specific identifier; and means, responsive to communications initiation, for performing a database lookup using the spacecraft identifier to determine a log-in status of the spacecraft, if the spacecraft is not logged into the operators database, then terminating the initiation of communications, wherein the operators database provides prompts to a caller requesting transmission of a digit related to a specific site in the spacecraft for connection to the caller.

17. The system of claim 16, further comprising:

means, responsive to the spacecraft being logged into the operators database, for outdialing at least one access number for at least one of the satellite systems and the spacecraft ID from the at least one operators database;

means, responsive to outdialing the access number, for generating a successful connection signal; and means, responsive to the connection signal, for initializing a system port to process a new call.

* * * * *

UNITED STATES PATENT AND TRADEMARK OFFICE
CERTIFICATE OF CORRECTION

PATENT NO. : 6,970,704 B2  
APPLICATION NO. : 10/029230  
DATED : November 29, 2005  
INVENTOR(S) : James W. Jensen et al.

Page 1 of 1

It is certified that error appears in the above-identified patent and that said Letters Patent is hereby corrected as shown below:

In the Claims in Col. 10, line 4, please correct "call management system" to read "call management program";
in Col. 10, line 43, please correct "the AOR-W" to read "AOR-W"; and
in Col. 10, line 55, please correct "call management system" to read "call management program".

Signed and Sealed this
Twenty-second Day of July, 2014

Michelle K. Lee
*Deputy Director of the United States Patent and Trademark Office*